United States Patent [19]
Strom et al.

[11] 3,860,402
[45] Jan. 14, 1975

[54] ABSORPTION OPTIMIZATION

[75] Inventors: Steven S. Strom; Henry P. Markant, both of Alliance, Ohio

[73] Assignee: The Babcock & Wilcox Company, New York, N.Y.

[22] Filed: Mar. 22, 1973

[21] Appl. No.: 343,995

Related U.S. Application Data

[62] Division of Ser. No. 130,738, April 2, 1971, Pat. No. 3,749,380.

[52] U.S. Cl. .................................... 55/90, 55/73
[51] Int. Cl. ................................... B01d 53/14
[58] Field of Search .............. 55/73, 90, 91, 233; 261/94, 95, 98

[56] References Cited
UNITED STATES PATENTS

| | | | |
|---|---|---|---|
| 3,302,372 | 2/1967 | Hynson et al. | 55/73 |
| 3,348,825 | 10/1967 | McIlvaine | 261/98 |
| 3,364,656 | 1/1968 | Whiton et al. | 261/94 |
| 3,409,279 | 11/1968 | Metrailer | 261/94 |
| 3,432,994 | 3/1969 | Whiton et al. | 55/91 |
| 3,525,197 | 8/1970 | Sheehan | 261/94 |

*Primary Examiner*—Charles N. Hart
*Attorney, Agent, or Firm*—J. M. Maguire; E. A. Mosley

[57] ABSTRACT

An apparatus which limits the movement of spheres of a fluidized bed to a linearly defined vertical path having hardly any horizontal breadth in a free flow area above such bed which is equivalent to between 3.5 and 5.0 times the diameter of the spheres for the optimization of the process of absorption. In other embodiments, the spheres of the bed are arranged in overall patterns according to their individual weight.

A process of maintaining improved overall absorption efficiencies in a tower of the spray variety by maintaining a constant holdup of liquid to gas flow ratio in the contact zone over a wide range of gas loads through the use of the aforesaid apparatus.

3 Claims, 6 Drawing Figures

PATENTED JAN 14 1975 3,860,402
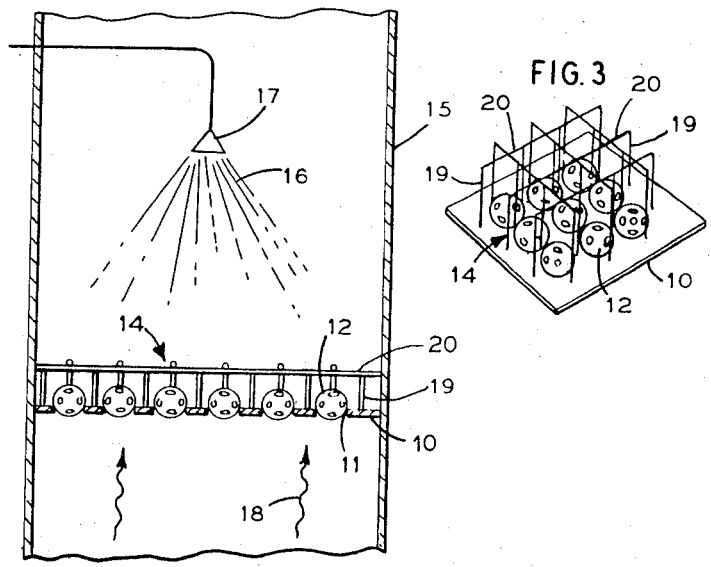
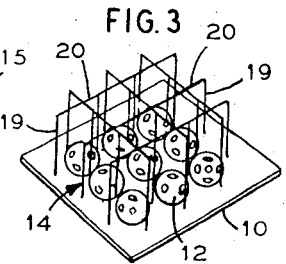
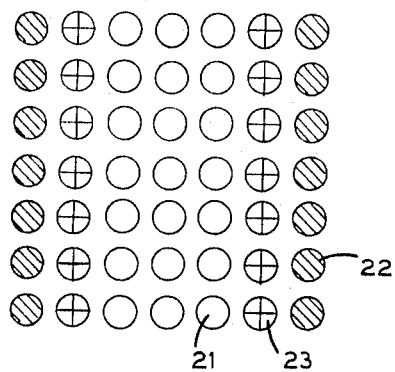
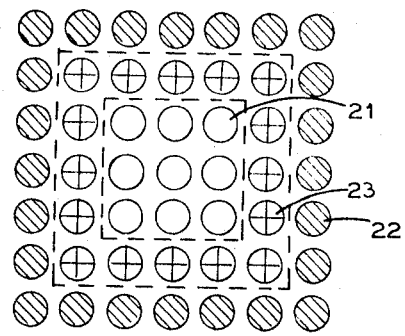
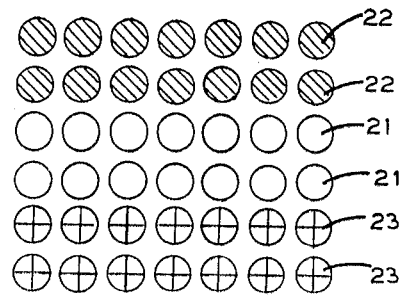
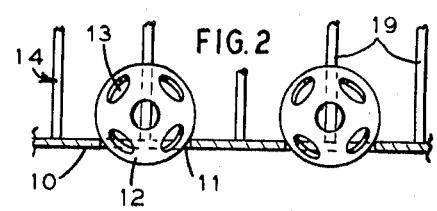

ABSORPTION OPTIMIZATION

This is a division of application Ser. No. 130,738, filed Apr. 2, 1971. U.S. Pat. No. 3,749,380.

This invention relates to a device for use in optimizing interface contact between fluids of a differing nature in countercurrent flow for the absorption of contaminants therebetween and a process of using the same.

More particularly, this invention relates to an apparatus and procedure for use in enhancing mutual contact between such fluids of a differing nature for the optimization of the absorption of impurities therebetween, one of such fluids being a liquid suspension and/or solution containing an absorbent and the other of which is a gaseous medium containing impurities.

With respect to gaseous mediums, the process of recovery is usually carried out by means of equipment of the classical variety such as towers, venturis and the like. Each of these may be normally quite effective on a constant load basis but difficulties usually arise when the load of the gaseous medium is varied. This is particularly evident when the load is decreased by about 50 to 75 percent of the design capacity.

For instance, common practice at power plants is to operate over a 3 and 4 to 1 load range. Furthermore, it is not uncommon to operate a power boiler at half load for extended durations of time in the range of about 6 months. However, as a result, with the conventional absorption apparatus, the efficiency of the absorption process is generally reduced in a drastic fashion when such load is decreased and maintained at such a low ebb.

The aforesaid problem exists because, as heretofore explained, the efficiency of the absorption process normally decreases as the gas flow deviates from design loads. For example, in a system for the absorption of sulfur dioxide by limestone, it has been found that the efficiency is not only dependent on the specific surface of the absorbent per unit volume of liquid but also on the relationship between the liquid holdup of the system to the gas flow. The liquid holdup in a simple column is a direct function of the liquid and gas flow. As the rate of gas flow is decreased, the holdup also decreases. The net result of decreasing both holdup and gas flow is a decrease in the efficiency of absorption of the system. Therefore, a decrease in the gas flow rate under certain conditions also causes a decrease in absorption.

What is needed in the art is a process for use in the absorption of such gaseous contaminants from flue gas which maintains a constant rate of absorption by such fluid suspension over a variable load range with respect to gaseous flow.

The subject invention answers the needs of the art with special emphasis on an apparatus for use in such a process which maintains constant ratio of liquid holdup to various gas and liquid flow rates to overcome the aforesaid difficulties and, as a result, to optimize the absorption efficiency of the system.

It is therefore an object of this invention to provide an apparatus for use in the contact zone of an absorption tower of the spray variety having differing fluids in counter-current flow, which apparatus maintains improved absorption efficiencies over a wide range of gas and liquid flow through such zone.

Another object is to provide an apparatus of the improved fluidizable bed variety for use in such system to render the same more economical to operate then conventional systems, in addition to maintaining the absorption efficiency therein in the range of more or less about 90 percent.

A further object is to provide a process of using such apparatus in an absorption system to attain the aforesaid efficiencies of operation.

Other objects and many of the attendant advantages of this invention will become more apparent to one skilled in the art from a reading of the following detailed description when taken with the accompanying drawings wherein:

FIG. 1. is a side view, in section, of a spray tower having the apparatus of this invention in place therein;

FIG. 2 is an enlarged view taken of a portion of FIG. 1;

FIG. 3 is a view of a module embodying this invention;

FIGS. 4 to 6 are views of various patterns of spheres which may be used.

The subject invention in the broad sense consists of a bed of fluidizable spheres each of which has a linearly defined vertical path with substantially no horizontal breadth in a free flow area above such bed which is equivalent to between 3.5 and 5.0 times the diameter of the spheres.

More specifically, the apparatus of this invention comprises a base for a bed of fluidizable spheres having a plurality of seats in the form of round openings, each of which is provided in overlying relationship with a perforated hollow sphere having a linearly defined vertical flow path without substantially any horizontal breadth in a free flow area above such bed of between 3.5 to 5.0 times the diameter of the fluidized spheres, each of such spheres being separably engageable to a particular seat in an overall pattern of varying density in response to the active forces of both a liquid and a gas in countercurrent flow.

In the preferred embodiment, as shown in FIGS. 1 to 3, the fluidizable bed is provided with a base plate 10 having a plurality of round-like openings 11 upon which a plurality of hollow spheres 12 are seated in overlying fashion. The aforesaid spheres are each provided with a plurality of perforations 13 which provides ingress to the interior thereof. The bed is also provided with a path-defining element such as an open wire lattice 14 which, in effect, cages each of the spheres into a specific free flow path or area above a particular round opening in the base plate 10.

Referring now to FIG. 1, the fluidizable bed of spheres is situated in place in a specific zone of a tower 15 of the spray-type variety wherein contact is made between a liquid suspension 16 gravitating in a downwardly direction in the form of a spray from a nozzle 17 and an upwardly moving gaseous medium 18 usually propelled by a fan (not shown). The liquid suspension 16 usually contains an absorbent such as calcium carbonate which is used for the extraction of contaminants such as sulfur dioxide from the gaseous medium 18. However, in some cases, the liquid can be directed into the contact zone by other means.

As shown in FIG. 2, the number and area of each of the individual perforations 13 of the individual hollow spheres 12 may be used to control their weight, and as a result, the lifting properties of the spheres themselves in the contact zone of the spray tower. However, there are many other means which may be used for weight control of the individual spheres including variations in density or thickness of spheres of constant volume, in addition to supplementation of weight by additives of proper choice.

FIG. 3 illustrates a typical lattice which may be used to control the flight path of the spheres. In this case, the lattice 14 consists of an open wire grid having vertical and horizontal guide-rails 19 and 20 for the definition of a free-flow aerial path for the spheres above the round openings 11 of the base 10. However, the same effect can be achieved with a grid structure of somewhat lesser area between cross members of each of the guide-rails, as long as the individual spheres are restrained in linear fashion to a vertical path having hardly any horizontal breadth.

The spheres are preferably arranged on the round seats 11 in an overall pattern according to weight. In general, the heaviest spheres should be at the extremities of the pattern and the lightest of such spheres should be situated in the pattern as a central core. For optimization of the process, the heaviest spheres should have a density less than the liquid suspension while the lightest of the spheres should have a density greater than the gas. However, there are many other arrangements which are possible so long as the spheres are arranged in a fashion to provide optimum gas-liquid distribution across the absorption column cross-section over a wide load range.

In one pattern, as shown in FIG. 4, the array is such that at least one interior longitudinal core of spheres 21 of relatively light weight is bounded by at least two longitudinal borders of spheres, one of which is made up of relatively higher weight 22 and the other of which is made up of spheres 23 having a weight intermediate the lightest and heaviest sphere in the pattern. Referring now to FIG. 5, another pattern is shown wherein the spheres are arranged so that the spheres 21 of relatively low weight form an interior core of the pattern and progress outwardly to at least one outer border of spheres 22 of relatively higher weight with at least one level of spheres 23 therebetween of intermediate weight. In another alternative of a pattern, refer to FIG. 6, wherein the arrangement is such that spheres are in place in linear column array according to weight with at least one longitudinal border of spheres 22 of relatively heavy weight progressing to at least one interior column of spheres 21 of relatively light weight with provision for at least one column of spheres 23 therebetween having a weight intermediate spheres 21 and 22.

It has been found, and the results are set forth below in Table I, that a sphere of the aforesaid type having a surface of specified apparent density will lift from the bed when the velocity of the gaseous medium reaches a specified value and will remain fluidized until retained against the upper restraining grid when such velocity exceeds a second value as set forth below. In these cases, the liquid flow rate was about 5,000 pounds per hour per square foot.

Table I

| Apparent Density of Sphere* | Velocity of Gas** | |
|---|---|---|
| | Lift | Retainment |
| a) 0.15 | 3 | 5½ |
| b) 0.177 | 4 | 9 |

Table I-Continued

| Apparent Density of Sphere* | Velocity of Gas** | |
|---|---|---|
| | Lift | Retainment |
| c) 0.221 | 6 | 12 |
| d) 0.226 | 6½ | 14 |
| e) 0.31 | 8 | 18 |

* pounds per square foot of spherical ball surface.
** feet per second based on absorption column cross-sectional free flow area.

One of the advantages of this type of apparatus is that at normal load, all the spheres would be fluidized. This fluidization provide a constant liquid holdup over the design load. However, as the load of the gas medium is decreased, the heavier spheres would no longer be fluidized, or at least not to the extent they previously were. As a result, the gaseous flow will channel towards the lighter spheres which are still fluidized and a constant holdup would be maintained as the load decreases. Also, due to the fact that each of the spheres is a hollow perforated element, upon being seated on the bed, they will not completely block the annular openings. Thus, if the liquid medium was in the form of a slurry, pluggage would not occur due to dead space and complete blockage of the bed would be avoided.

Therefore, as heretofore described, by proper selection of the weights of the various spheres, turndown ratios of two or three, and possibly even higher, would be practical while maintaining a constant rate of efficiency. For instance, in a spray tower adapted in series with two stages of the present apparatus wherein the liquid slurry, which contained about 5 per cent of a solid $CaCO_3$ absorbent of a 3 micron particle size, was flowing at a rate of about 7,400 lbs/hr/sq.ft., the efficiency of absorption of sulfur dioxide from the gaseous medium was about 90 percent over a flow range for the gaseous medium of about 2 to 12 feet per second. A further additional benefit that can be obtained with this type of fluidized bed is that it may even be adapted to function over and above design capacity by merely changing the weight of the spheres.

In summary, the apparatus of this invention permits by proper selection of the packing or spheres, a high turndown ratio while maintaining a constant level of holdup thereby optimizing efficiency of absorption over a wide range of loads. The support plate or base as described allows the packing or spheres to partially block the round openings when not fluidized. Thus, the open nature of the spheres precludes complete blockage of the sections of the apparatus. Also, the apparatus, as described, can be used in series as a separate unitary stage or as one module of a multi-modular stage depending on the size of contact zone of the tower. In any case, the efficiency of the absorption process is optimized with the use of the apparatus of the present invention.

What is claimed is:

1. In the process of absorption between a liquid and a gas wherein a contact zone is provided for flow of liquid downwardly and gas upwardly therethrough, the lower end portion of the contact zone being restricted flow wise by a plurality of spaced openings, a plurality of spheres corresponding in number with and having a dimension greater than the spaced openings, each of the spheres being substantially of the same dimensions and having selected different weights, and each sphere being limited in vertical movement by a plurality of vertical rods forming a defined lineal path several times the diameter of the sphere and having hardly any horizontal breadth, the improved method of operation comprising maintaining a substantially uniform flow of liquid downwardly into said contact zone, and regulating the upward flow of gas into said contact zone between a maximum flow rate fluidizing all of said spheres in the contact zone with all of the spaced openings being open for gas and liquid flow therethrough and at a minimum flow rate fluidizing only the lightest weight spheres with only the spaced openings corresponding with the light weight spheres being open for flow therethrough whereby a substantially constant holdup of liquid is attained in the contact zone for optimum absorption efficiency during liquid and gas contact.

2. In the process of claim 1 wherein the apparent density of each sphere is in the range of 0.15 and 0.31 pounds per square foot of spherical surface.

3. In the process of claim 2 wherein the spheres are hollow and perforated.

* * * * *